UNITED STATES PATENT OFFICE.

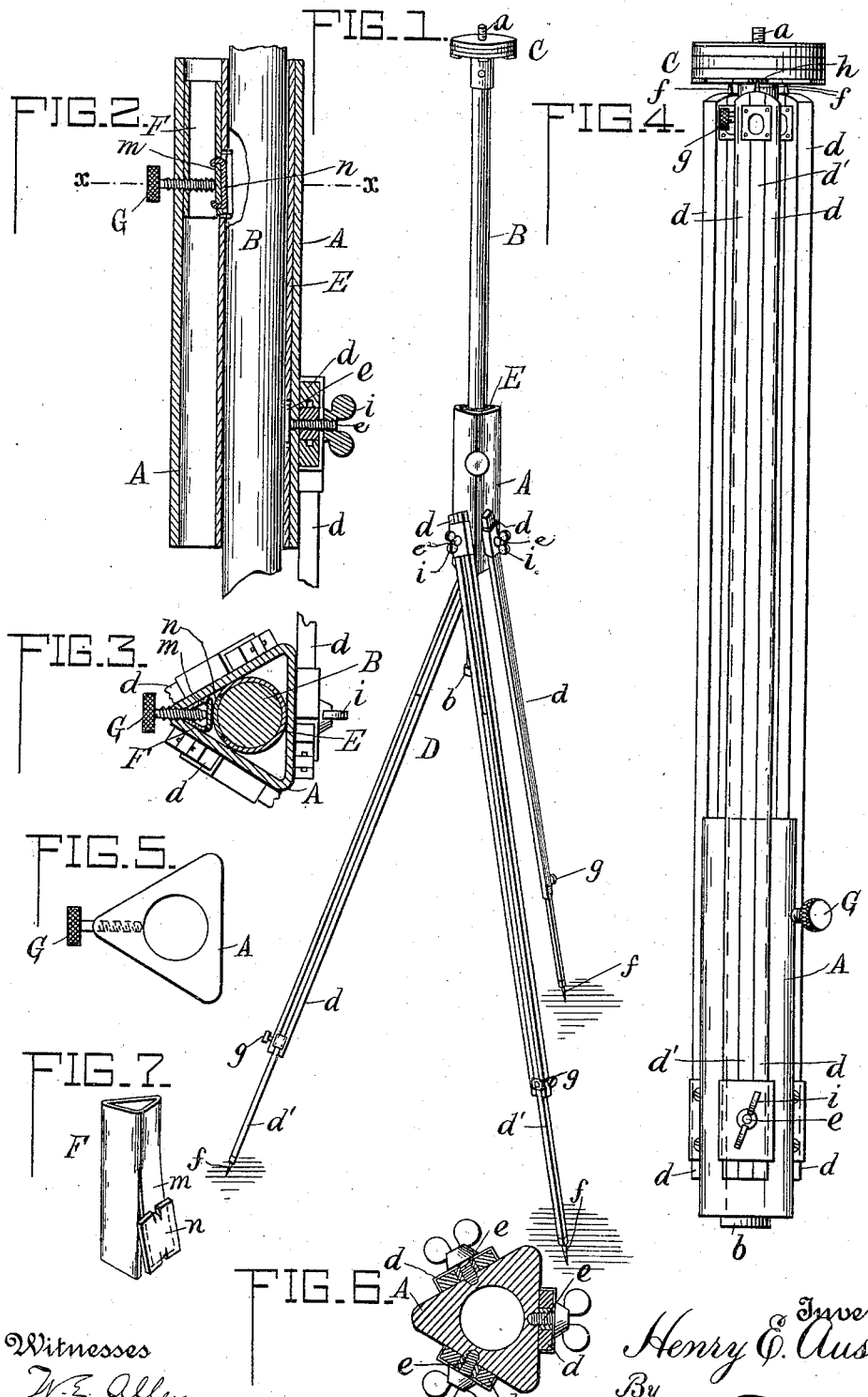

HENRY E. AUSTIN, OF PORT TREVORTON, PENNSYLVANIA.

TRIPOD.

SPECIFICATION forming part of Letters Patent No. 627,170, dated June 20, 1899.

Application filed March 18, 1899. Serial No. 709,591. (No model.)

*To all whom it may concern:*

Be it known that I, HENRY E. AUSTIN, a citizen of the United States, residing at Port Trevorton, in the county of Snyder and State of Pennsylvania, have invented new and useful Improvements in Tripods, of which the following is a specification.

My invention relates to that class of portable stands commonly known as "tripods," adapted to support a camera or other instrument and which are capable of folding into a small compass, so as to be conveniently carried; and my invention consists in the parts and the constructions and combinations of parts, which I will hereinafter fully describe and claim.

Referring to the accompanying drawings, in which similar letters of reference indicate corresponding parts, Figure 1 represents a perspective view of a tripod embodying my invention. Fig. 2 is a vertical sectional view, on an enlarged scale, showing the legs broken away. Fig. 3 is a transverse sectional view on the line $xx$ of Fig. 2. Fig. 4 is a view of the tripod in a closed or folded condition. Figs. 5 and 6 are modifications to be referred to. Fig. 7 is a perspective view of the inner tube F detached.

In said drawings, A represents a body or socket piece of appropriate dimensions transversely and longitudinally, having by preference a central cylindrical socket or opening in which is mounted to slide and axially turn a corresponding post B, the upper end of which is formed with or has fitted to it a disk or head C, with a fixed and permanent stud or screw $a$, by which the camera or other instrument may be screwed or secured fixedly in position, said post having at its lower end a plate or flange $b$, adapted to contact with the under side of the body or socket piece to prevent the entire removal of the post from the body. Being thus mounted in the body or socket piece A, the post is capable of a longitudinal movement to adjust the disk or head and the supported camera or instrument to different vertical elevations, and said post is axially turnable from any point of adjustment to secure or release the screw or stud from the camera or other instrument.

The exterior of the body or socket piece is angular and preferably triangular in cross-section to present flat surfaces standing at an angle with relation to each other, and to each of these surfaces one of the supporting-legs D is pivotally connected, whereby the legs open and close about their pivotal points without danger of one traversing the path of and interfering with the others. These legs are of any well-known and appropriate type. They are shown as each consisting of two sections $d\,d'$, one of which, $d$, is pivoted to swing upon threaded studs $e$ and the other, $d'$, telescopes or slides within its companion in the usual manner and has a point $f$ at its lower end to engage the ground or floor and prevent an accidental movement of the legs. Set-screws $g$ are provided to lock the extensible sections of the legs in their adjusted or closed positions, and the under side of the head C is provided with a series of openings $h$, which receive the points $f$ when the tripod is collapsed and the legs folded, as shown in Fig. 4, whereby the legs are securely held against accidental opening.

The pivotal points of the legs are near the lower end of the body, and when the legs are folded or reversed they lie along the portions of the angular faces above the pivotal connections, and are thereby supported and braced against inward pressure and consequent strain upon the pivots. It will be understood that this last-named result is accomplished by first sliding the sections $d'$ of the legs into their companion members and turning the latter about their pivotal centers until the points $f$ are presented upwardly, the post B having previously been elevated, when the said post is pressed down and each of the points $f$ directed into one of the openings in the under side of the head or disk C. A reverse movement of the post releases the head from the points $f$ and enables the legs to be unfolded.

The body or socket piece may be formed of any material. It may be made tubular and a solid piece of metal, papier-mâché, or plastic or semiplastic material molded into proper form and having the heads of the studs $e$ fixed therein, or it may be made solid and of wood bored centrally to form the socket for the post and having said studs driven or secured therein, as shown in Fig. 6.

In the form shown in Figs. 1, 2, and 3 the body or socket piece A is made hollow and in the form of a tube triangular in cross-section, and interior to this is a smaller cylindrical tube E, which is held in place by the studs which pass through the exterior tube or body and have their heads countersunk in the inner tube, so as not to project beyond the plane of the inner sides of the inner tube, the outer ends of the studs passing through the inner ends of the sections $d$ of the legs and engaged by thumb-nuts $i$ to clamp the sections against the flat outer sides of the body, as shown. This arrangement secures the inner tube, forms a strong bearing for the studs, and prevents the heads of the studs abrading the exterior of the slidable and turnable post or interfering with the movements of the latter.

To hold the post and supported camera in any adjusted position, I use a clamp consisting of a split tube F, fitted in one of the angles of the body A between the inner wall of the latter and the exterior wall of the inner tube E, said split tube extending some distance along the tube E and having a member or tongue $m$, to which is secured or fitted a curved plate $n$, which lies within an opening in the inner tube, said plate being engaged by the inner end of a screw G, which passes through the wall of the body A and one wall of the split tube, so that when its exterior milled head is turned the screw forces the tongue or member outward and causes the plate $n$ to be pushed out of its opening and to be pressed with sufficient friction against the post B to securely hold the latter at any point to which it is adjusted.

A tripod constructed as herein described is simple in its construction, is light and portable, easily operated, and can be used for outdoor work where the ground may be hilly or undulating without making difficult the accurate leveling of the camera under all conditions.

Each leg of the tripod being mounted on an angular face of the body, it is capable of a movement independent of the others. Therefore no matter what the condition of the surface on which the tripod is set the camera when once focused can be easily leveled by turning one or more of the legs about the pivotal connection, and the legs are also capable of folding about said connections, so that when the device is closed each leg lies upon and parallel with its companion angular surface, in which position it is held by one of the holes in the head C engaging the point on the outer extremity of the leg.

Having thus described my invention, what I claim as new, and desire to secure by Letters Patent, is—

1. In a tripod, the combination of a body or socket piece, legs pivotally united thereto and capable of folding into an inverted position, a post slidable in the body and having means for supporting an instrument, means whereby the post is adjustable to different elevations and means carried by the post and adapted to engage and lock the legs in their folded condition.

2. In a tripod, the combination of a body or socket piece angular in cross-section and with the outer sides forming an extended bearing for the legs when the latter are reversed, legs pivotally secured to the lower portions of the sides of said body and capable of reversal so as to lie parallel with and against the portions of said sides above the pivotal connections, and means for locking the legs in this reversed position.

3. In a tripod, the combination of a body or socket piece angular in cross-section, legs, each pivotally secured to one of the faces of the body whereby said legs are movable tangentially with relation to each other and are foldable to lie substantially in the plane of the sides of said body, means for holding the legs to the body in either an open or closed condition, a slidable and axially-turnable post mounted in the body and provided with means for securing it in a fixed position, and a head carried by the post and having a fixed stud adapted to engage a camera or other instrument said head provided with means to engage the legs and hold them in a folded condition.

4. In a tripod, the combination, of a body or socket piece angular in cross-section, legs pivotally united to the faces of said body and having extensible members or sections provided with points on the outer ends, a post slidably mounted in the body and provided, at its upper end, with a head adapted to support a camera, said head having openings in its under surface adapted to receive and hold said points when the legs are folded, and means for holding the post in a fixed position.

5. In a tripod, the combination of a body consisting of an inner and an outer tube the outer tube having an angular exterior, a post slidably mounted in the interior tube, means for clamping the post to hold the latter against movement, a head on the post for supporting a camera, legs pivotally secured to the outer faces of the body and means carried by the head and adapted to engage and hold said legs in an inverted condition.

6. In a tripod, the combination of a body consisting of an outer tube triangular in cross-section and a cylindrical inner tube having an opening in one side, a post slidably mounted in the inner tube, a split tube between the inner and outer tubes and having an elastic tongue or member provided with a plate adapted to lie within the opening in the inner tube, a screw engaging said member to force the plate against the post whereby the post is fixed against movement, stud-bolts projecting from the exterior faces of the body, legs pivotally mounted on said bolts and thumb-nuts of the bolts adapted to clamp the legs in position, either open or closed.

7. A tripod including a body or socket piece angular in cross-section and with the outer sides forming an extended bearing for the legs when the latter are reversed, means for supporting an instrument, and legs pivotally secured to the lower portions of the sides of said body and capable of reversal whereby the portions of the sides of the body above the pivotal connections form an extended bearing and support the folded legs against inward pressure.

8. In a tripod, the combination of a body or socket piece angular in cross-section, legs pivotally secured to the sides of said body and capable of swinging about their pivots to reverse their positions, when the tripod is not in use, a post slidably mounted in said body and provided with a head, means for securing the post in position and means for securing the legs in both their open and closed positions.

In testimony whereof I have hereunto set my hand in presence of two subscribing witnesses.

HENRY E. AUSTIN.

Witnesses:
T. WALTER FOWLER,
GEO. E. TERRY.